(12) United States Patent
Kim

(10) Patent No.: US 12,490,916 B2
(45) Date of Patent: Dec. 9, 2025

(54) BEHAVIOR ANALYSIS SYSTEM OF LIVESTOCK USING ACCELERATION SENSOR AND BEHAVIOR ANALYSIS METHOD USING SAME

(71) Applicant: uLikeKorea Co., Inc., Seoul (KR)

(72) Inventor: Heejin Kim, Seoul (KR)

(73) Assignee: uLikeKorea Co., Inc., Seoul (KR)

( * ) Notice: Subject to any disclaimer, the term of this patent is extended or adjusted under 35 U.S.C. 154(b) by 1064 days.

(21) Appl. No.: 17/515,076

(22) Filed: Oct. 29, 2021

(65) Prior Publication Data

US 2022/0133175 A1    May 5, 2022

Related U.S. Application Data

(60) Provisional application No. 63/108,001, filed on Oct. 30, 2020.

(51) Int. Cl.
*A61B 5/11* (2006.01)
*A01K 11/00* (2006.01)
(Continued)

(52) U.S. Cl.
CPC .......... *A61B 5/1118* (2013.01); *A01K 11/007* (2013.01); *A01K 29/005* (2013.01); *A61B 5/0002* (2013.01); *A61B 5/01* (2013.01); *A61B 5/03* (2013.01); *A61B 5/11* (2013.01); *A61B 5/1126* (2013.01); *A61B 5/14539* (2013.01); *A61B 5/74* (2013.01); *G01P 15/18* (2013.01);
(Continued)

(58) Field of Classification Search
CPC ....... A61B 5/1118; A61B 5/0002; A61B 5/01; A61B 5/03; A61B 5/11; A61B 5/1126; A61B 5/14539; A61B 5/74; A61B 2503/40; A61B 2562/0219; A61B 5/0022; A61B 5/07; A61B 5/4809; A01K 11/007; A01K 29/005; G01P 15/18

See application file for complete search history.

(56) References Cited

U.S. PATENT DOCUMENTS 11,857,347 B2 *  1/2024  Laporte-Uribe ......... A61B 5/01
2004/0074448 A1 * 4/2004  Bunt .................... A01K 11/006
                                                        119/421
(Continued)

FOREIGN PATENT DOCUMENTS

KR       10-1726366 B1    4/2017

OTHER PUBLICATIONS

AlZahal, O. et al., "The use of a radiotelemetric ruminal bolus to detect body temperature changes in lactating dairy cattle", Journal of Dairy Science, 2011, vol. 94, No. 7, pp. 3568-3574.
(Continued)

*Primary Examiner* — Ryan W Sherwin
(74) *Attorney, Agent, or Firm* — Hauptman Ham, LLP

(57) ABSTRACT

Provided are a behavior analysis system of livestock using an acceleration sensor and a behavior analysis method using the same, which mount a biocapsule including an acceleration sensor on a rumen of livestock and transmit a sensor value sensed by a behavior of the corresponding livestock, analyze a sensor value transferred from each entity and analyze the behavior of the livestock by the server, and predict and judge a health state, or a timing of estrus or a delivery of the livestock through the analyzed behavior to efficiently manage the livestock.

9 Claims, 22 Drawing Sheets

(51) Int. Cl.
| | |
|---|---|
| *A01K 29/00* | (2006.01) |
| *A61B 5/00* | (2006.01) |
| *A61B 5/01* | (2006.01) |
| *A61B 5/03* | (2006.01) |
| *A61B 5/145* | (2006.01) |
| *G01P 15/18* | (2013.01) |

(52) U.S. Cl.
CPC ... *A61B 2503/40* (2013.01); *A61B 2562/0219* (2013.01)

(56) References Cited

U.S. PATENT DOCUMENTS

| | | | | |
|---|---|---|---|---|
| 2011/0301437 | A1* | 12/2011 | Gabriel | A01K 11/007 600/301 |
| 2018/0271066 | A1* | 9/2018 | Balbian | A01K 11/007 |
| 2018/0310522 | A1* | 11/2018 | Bancroft | H01Q 21/0075 |
| 2018/0310885 | A1* | 11/2018 | Kim | G16H 40/67 |
| 2020/0375148 | A1* | 12/2020 | Magazzù | A61B 5/0002 |
| 2022/0000388 | A1* | 1/2022 | Astl | A01K 11/007 |
| 2024/0172721 | A1* | 5/2024 | Savage | A61B 5/6861 |

OTHER PUBLICATIONS

Andersson, L.M. et al., "Wearable wireless estrus detection sensor for cows", Computers and Electronics in Agriculture, 2016, vol. 127, pp. 101-108.

Arai, S. et al., "Evaluation of ruminal motility in cattle by a bolus-type wireless sensor", The Journal of Veterinary Medical Science, 2019, vol. 81, No. 12, , pp. 1835-1841.

Barker, Z.E et al., "Use of novel sensors combining local positioning and acceleration to measure feeding behavior differences associated with lameness in dairy cattle", Journal of Dairy Science, 2018, vol. 101, No. 7, pp. 6310-6321.

Braun, U. et al., "Ultrasonographic evaluation of reticular motility in cows after administration of atropine, scopolamine and xylazine", Journal of Veterinary Medicine A, 2002, vol. 49, pp. 299-302.

Carpinelli, N.A. et al., "Technical note: A novel approach to estimate dry matter intake of lactating dairy cows through multiple on-cow accelerometers", Journal of Dairy Science, 2019, vol. 102, No. 12, pp. 11483-11490.

Daniel, R.C.W., "Motility of the rumen and abomasum during hypocalcaemia", Canadian Journal of Comparative Medicine, 1983, vol. 47, pp. 276-280.

Foster, D., "Disorders of rumen distension and dysmotility", Veterinary Clinics of North America: Food Animal Practice, 2017, vol. 33, pp. 499-512.

Fricke, P.M. et al., "Expression and detection of estrus in dairy cows: the role of new technologies", Animal, 2014, vol. 8, pp. 134-143.

Goff, J.P., "Macromineral disorders of the transition cow", Veterinary Clinics of North America: Food Animal Practice, 2004, vol. 20, No. 3, pp. 471-494.

Hamilton, A.W. et al., "Identification of the rumination in cattle using support vector machines with motion-sensitive bolus sensors", Sensors, 2019, vol. 19, pp. 1165.

Homer, E.M. et al., "Technical note: A novel approach to the detection of estrus in dairy cows using ultra-wideband technology", Journal of Dairy Science, 2013, vol. 96, No. 10, pp. 6529-6534.

Jyotsana, M. et al., "Metabolic alterations in buffaloes suffering from digestive disorders", The Haryana Veterinarian, Dec. 2013, vol. 52, pp. 71-72.

Leek, B.F., "Clinical diseases of the rumen: a physiologist's view", The Veterinary Record, 1983, vol. 113, No. 1, pp. 10-14.

Neethirajan, S., "Recent advances in wearable sensors for animal health management", Sensing and Bio-Sensing Research, 2017, vol. 12, pp. 15-29.

Neubauer, V. et al., "Differences between pH of indwelling sensors and the pH of fluid and solid phase in the rumen of dairy cows fed varying concentrate levels", Journal of Animal Physiology and Animal Nutrition, 2018, vol. 102, pp. 343-349.

Nogami, H. et al., "Minimized bolus-Type wireless sensor node with a built-In three-axis acceleration meter for monitoring a cow's rumen conditions", Sensors, 2017, vol. 17, pp. 687.

Okada, K. et al., "Detection of hoof diseases in cattle using a triaxial accelerometer", Japanese Journal of Large Animal Clinics, 2011, vol. 2, No. 4, pp. 183-188.

Rahman, A. et al., "Cattle behaviour classification from collar, halter, and ear tag sensors", Information Processing in Agriculture, 2018, vol. 5, pp. 124-133.

Sato, S. et al., "A radio transmission pH measurement system for continuous evaluation of fluid pH in the rumen of cows", Veterinary Research Communications, 2012, vol. 36, pp. 85-89.

Stevenson, J.S. et al., "Ovulation timing and conception risk after automated activity monitoring in lactating dairy cows", Journal of Dairy Science, 2014, vol. 97, No. 7, pp. 4296-4308.

Thompson, J.R. et al., "Antagonistic effect of atipamezole on xylazine-induced sedation, bradycardia, and ruminal atony in calves", American Journal of Veterinary Research, 1991, vol. 52, No. 8, pp. 1265-1268.

Vazquez Diosdado, J.A. et al., "Classification of behaviour in housed dairy cows using an accelerometer-based activity monitoring system", Animal Biotelemetry, 2015, vol. 3, pp. 15.

Wolfger, B. et al., "Technical note: Accuracy of an ear tag-attached accelerometer to monitor rumination and feeding behavior in feedlot cattle", Journal of Animal Science, Jun. 2015, vol. 93, No. 6, pp. 3164-3168.

\* cited by examiner

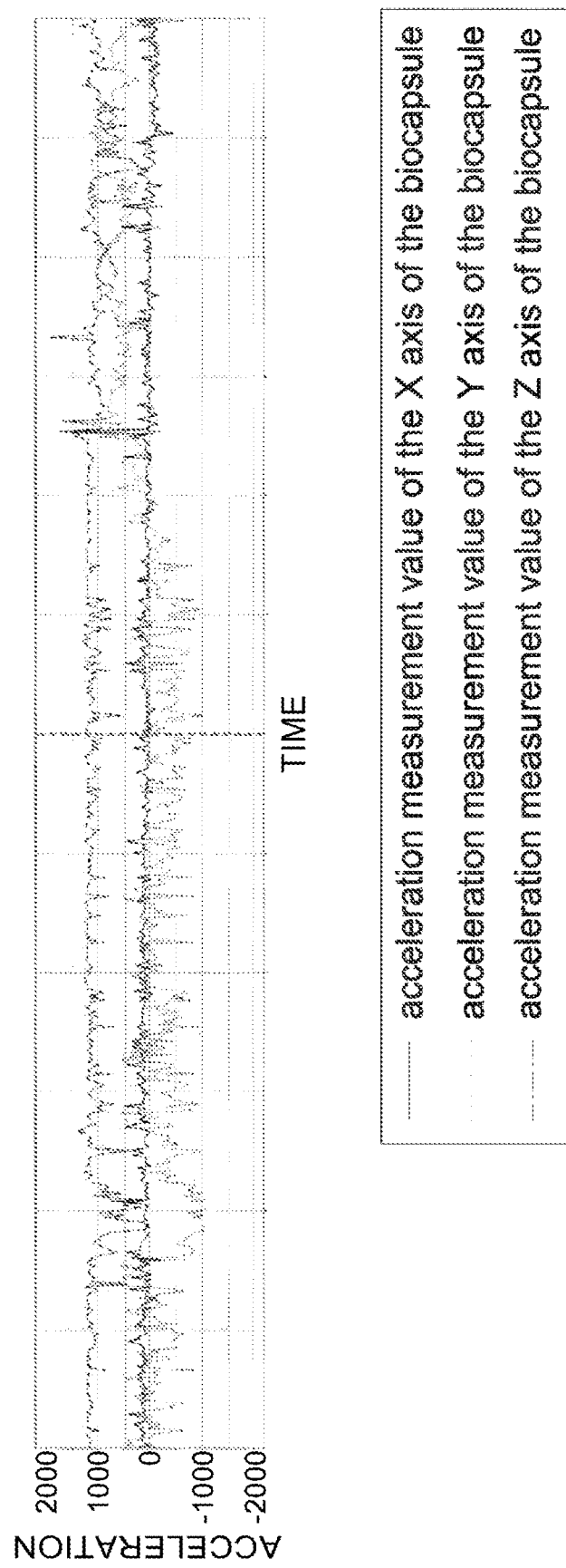

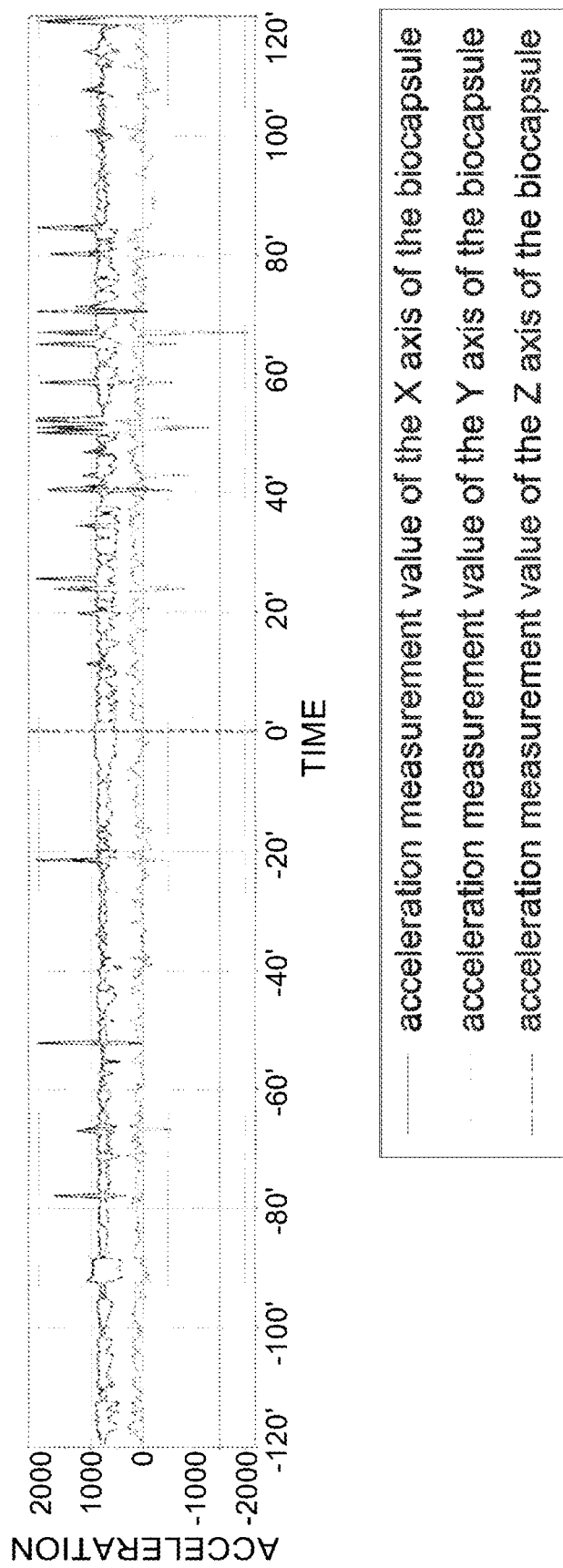

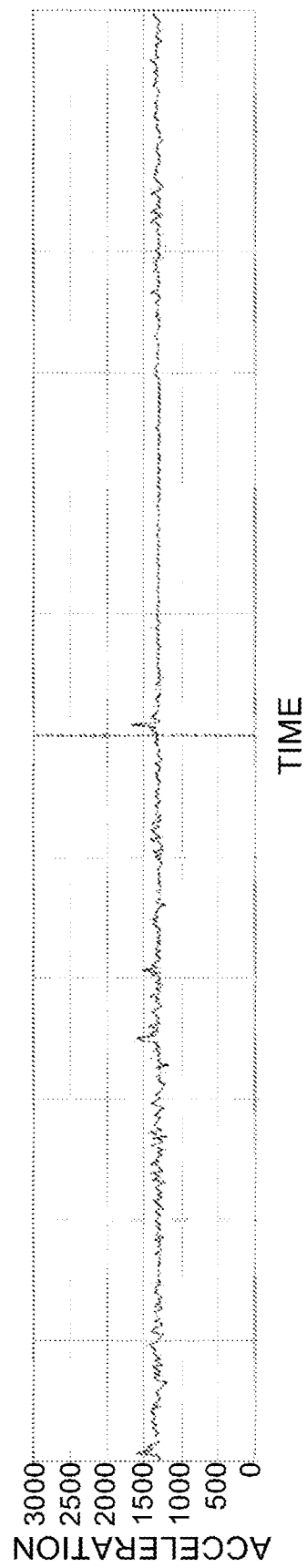

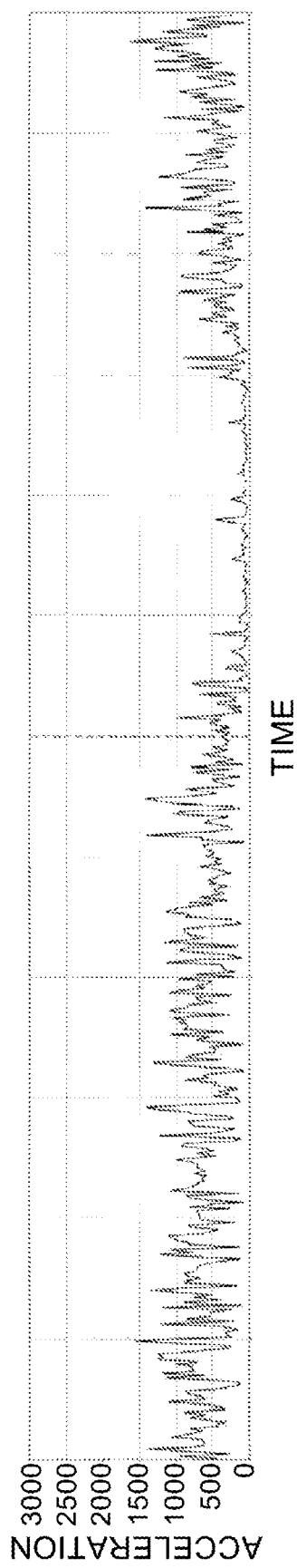

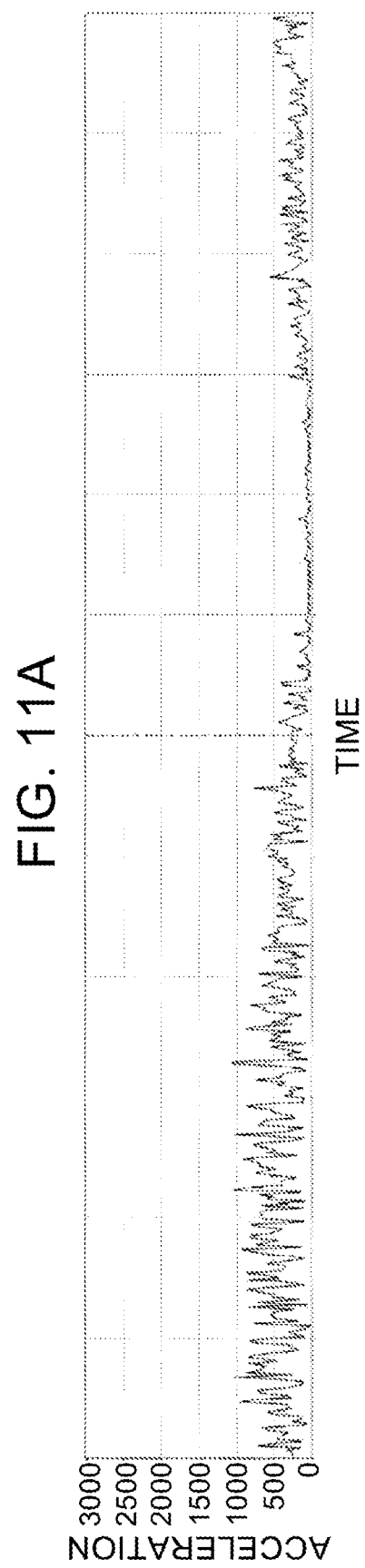

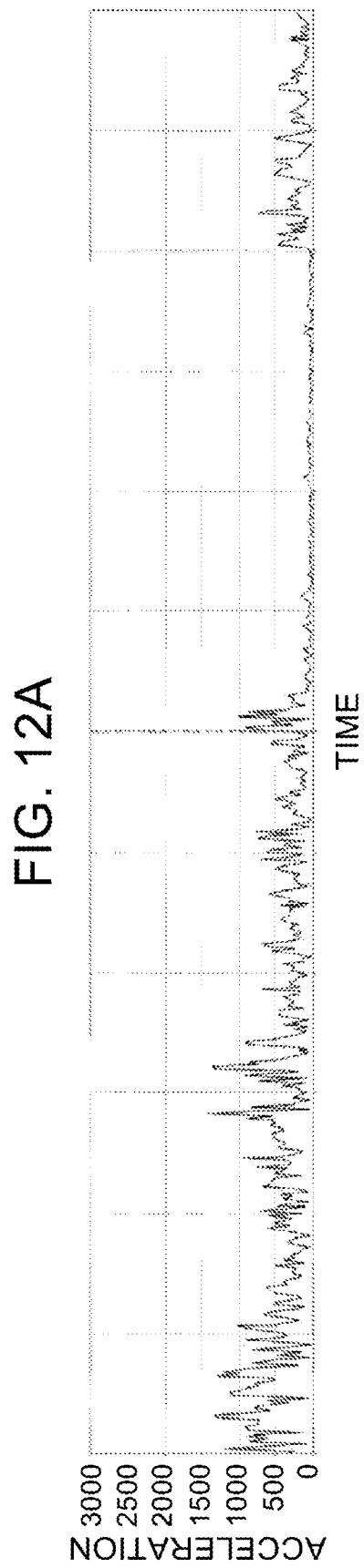

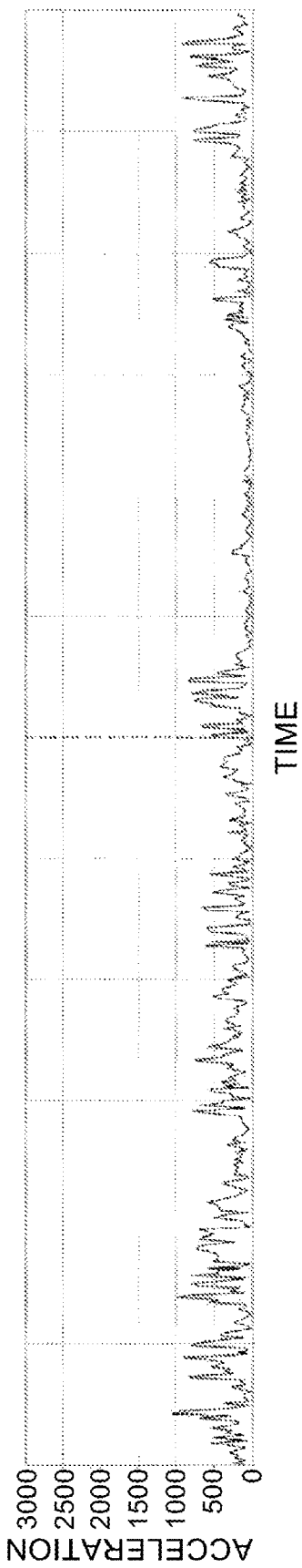

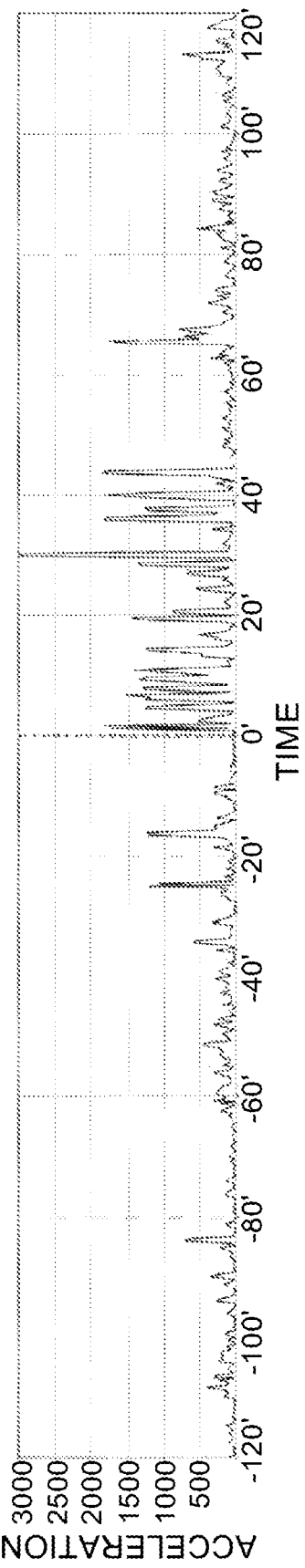

BEHAVIOR ANALYSIS SYSTEM OF LIVESTOCK USING ACCELERATION SENSOR AND BEHAVIOR ANALYSIS METHOD USING SAME

CROSS-REFERENCE TO RELATED APPLICATIONS

This application is based upon and claims the benefit of priority from the Provisional Application No. 63/108,001, filed on Oct. 30, 2020, the entire contents of which are incorporated herein by reference.

BACKGROUND OF THE DISCLOSURE

Field of the Disclosure

The present disclosure relates to a behavior analysis system of livestock using an acceleration sensor and a behavior analysis method using the same, and more particularly, to a behavior analysis system of livestock using an acceleration sensor and a behavior analysis method using the same, which detect and analyze behaviors such as an intake, rumination, and relaxation of livestock having a rumen to determine a health state, or a timing of or estrus, or a delivery of the corresponding livestock.

Related Art

In general, it is possible to produce beef and milk through beef cattle, including cows and Korean cattle, which are mainly raised on a cattle farm. Meanwhile, since the farm raises multiple cattle rather than a small number of cattle, there is an inconvenience that it is difficult to individually take care of the respective cattle. In the case of taking care of livestock including the cattle, it is difficult to easily determine a health state of the livestock from the outside, and when one livestock is infected with an infectious disease, the infectious disease easily spreads to a surrounding area, and as a result, there is a risk that a large-scale death may occur. In order to prevent such a problem, the development of technology capable of individually managing the cattle on the cattle farm is required.

In related art, as prior art that can measure a motion of each of a large amount of ruminant animals by directly coupling and fixing a device to a body such as a neck or ear of the ruminant animal, Korean Patent Registration No. 10-1726366 discloses "Momentum detection system and method of the bull or the cow on a domestic bull or cow farm".

The prior art is provided on a necklace of the ruminant animal and transmits GPS positional information and visual information to a monitoring server at a predetermined time interval, and when a sensor for sensing the motion of the ruminant animal is provided outside the body of the ruminant animal as such, the sensor is exerted by an external influence and it is thus difficult to sense an accurate momentum and even when only the necklace moves by external force, it is regarded that the ruminant animal is active, and as a result, there is a concern that the momentum will be measured as a wrong momentum. In particular, even when the ruminant animal keeps still due to resting in a healthy state, the momentum of the cattle is judged to be small, and as a result, it may be misjudged that the body of the ruminant animal is abnormal.

Meanwhile, the ruminant animal including the cattle has a rumen, and a rumen motility indicating a momentum of the rumen is one main type of biological information for evaluating the health state of the ruminant animal. In general, the rumen motility can be clinically evaluated through auscultation of the paralumbar fossa. The rumen motility is reduced in cattle having various diseases including a gastrointestinal disorder of the livestock in addition to diseases related to other organs. In particular, a metabolic disease mainly occurring after a delivery in a cow also causes reduction of the rumen motility of the livestock.

However, as described above, it is difficult to directly auscultate and monitor the rumen motility of all cattle raised in the farm and there is a problem in that a lot of time and effort are consumed even in digitizing and organizing a monitored value. In particular, since veterinarians and farmers cannot sense the rumen motility while auscultating the cattle every time, even when an abnormal state of the cattle which can be confirmed through the rumen motility is abruptly expressed, the abnormal state of the cattle cannot be confirmed, and as a result, there is also a problem in that the cattle can get a disease or die.

SUMMARY

The present disclosure provides a behavior analysis system of livestock using an acceleration sensor and a behavior analysis method using the same, which directly mount a biocapsule capable of monitoring a rumen motility within a rumen and transfer a sensor value to the outside through wireless communication to monitor a lot of livestock at once and judge a health state, or a timing of estrus or a delivery of the livestock through the monitoring to enhance a production of a cattle farmer, and prevent a disease or death of the livestock.

The present disclosure also provides a behavior analysis system of livestock using an acceleration sensor and a behavior analysis method using the same, which more accurately sense the rumen motility by deriving an equation capable of rapidly determining the rumen motility rather than an equation for calculating a momentum of the livestock using the acceleration sensor in the related art, and applying the derived equation to enhance reliability and accuracy of a behavior analysis of a ruminant animal.

The present disclosure also provides a behavior analysis system of livestock using an acceleration sensor and a behavior analysis method using the same, which determine sleep and non-sleep states of the livestock according to the momentum of the rumen, minimizes battery consumption by automatically adjusting an operation time and a sensing time of a biocapsule according to a monitoring requirement time, and can be used for a long time.

The objects to be solved by the present disclosure are not limited to the aforementioned objects, and other objects, which are not mentioned above, will be apparent to a person having ordinary skill in the art from the following description.

In order to solve the problem, in an aspect, disclosed is a system for analyzing a behavior of a ruminant animal using an acceleration sensor, which includes: a biocapsule injected into a rumen in livestock and embedded with the acceleration sensor; and a server analyzing a sensor value transferred from the biocapsule and analyzing a health or abnormal state of the corresponding livestock, in which the biocapsule transmits, to the server, a 3-axis specific acceleration measurement value measured by the acceleration sensor by wireless communication, the server includes a judgment module judging and analyzing a state of the corresponding livestock by comparing the sensor value transferred from the biocapsule and a prestored set value, and a storage module storing the set value, and the judgment module applies the 3-axis specific acceleration measurement value transferred from the acceleration sensor to a prestored following equation and an acceleration V2 of the biocapsule, compares the calculated acceleration V2 and the preset set value, and analyzes the health or abnormal state of the corresponding livestock.

$$V2=\sqrt{(X_t-X_{t-1})^2+(Z_t-Z_{t-1})^2}$$ [Equation]

Here, X represents an acceleration measurement value of the X axis of the biocapsule, Z represents an acceleration measurement value of the Z axis of the biocapsule, and t represents a time.

Further, the biocapsule may include an internal sensor sensing an internal environment of the rumen within the livestock, and a capsule communication module connected to the server through the wireless communication and transmitting the sensor value.

In this case, the internal sensor may be capable of at least one of a temperature, a pressure, pH, and an amount of methane generated from the rumen.

Further, the judgment module may synthesize an acceleration calculated through the 3-axis acceleration measurement value transferred from the acceleration sensor and the sensor value sensed by the internal sensor, and compare the synthesized value with a preset set value to analyze the state of the livestock.

Further, the biocapsule may include a driving module controlling whether the biocapsule is driven through a control value transferred from the server, the server may include a counting module prestoring a minimum value of an acceleration measurement value generated when the livestock is in a non-sleep state and counting the number of times when the acceleration measurement value measured through the biocapsule decreases to the minimum value or less, and the counting module may judge whether the livestock is in the sleep state when the number of times when the acceleration measurement value measured through the biocapsule decreases to the minimum value or less is more than the prestored number of times, and transfer the control value to the driving module to drive the biocapsule using minimum power.

In this case, the counting module may count the number of times when the livestock is altered to the sleep and non-sleep states, and compare the counted number of times with the number of times when the livestock in the normal state is altered to the sleep and non-sleep states within the same preset time, and judge that the corresponding livestock is in the abnormal state when the counted number of times is more than the number of times when the livestock in the normal state is altered to the sleep and non-sleep states within the same preset time.

In order to solve the problem, disclosed is a behavior analysis method through a behavior analysis system of livestock using an acceleration sensor, which includes: a biocapsule seating step of mounting a biocapsule within a rumen within livestock; a sensing and transmitting step of sensing a 3-axis specific acceleration by the biocapsule mounted on the rumen and transmitting the sensed 3-axis specific acceleration measurement value to a server; a rumen mobility calculating step of calculating a rumen mobility of the corresponding livestock through the 3-axis specific acceleration measurement value transmitted from the server; a final judgment step of comparing the calculated rumen mobility and a rumen mobility of livestock in a normal state, which is prestored to judge the normal state or an abnormal state of the corresponding livestock; and a notification and driving control step of transmitting a notification message according to the corresponding abnormal state to an external output device linked with the server when the abnormal state is sensed in the final judgment step.

Further, in the sensing and transmitting step, an internal environment of the rumen in the livestock may be sensed in addition to an acceleration in the biocapsule, the internal environment may include at least one of a temperature, a pressure, pH, and an amount of methane generated from the rumen, and in the final judgment step, the normal state or abnormal state of the livestock may be judged through the acceleration measured from the biocapsule and the internal environment.

Further, in the final judgment step, the acceleration measurement value transferred from the biocapsule and the rumen mobility of the livestock in the normal state in a non-sleep state, which is prestored in the server, may be compared, the number of times when the acceleration measurement value is less than the rumen mobility is counted, and when the counted number of times is counted to be equal to or more than a preset number of times, it may be judged that the corresponding livestock is in the sleep state, and in the notification and driving control step, when it is judged that the corresponding livestock is in the sleep state in the final judgment step, driving of the biocapsule in the corresponding livestock may be stopped and the biocapsule may be redriven after a preset time.

In this case, the number of times when the livestock is altered to the sleep and non-sleep states may be counted, and the counted number of times with the number of times when the livestock in the normal state is altered to the sleep and non-sleep states within the same preset time may be compared, and, in the final judgment step, it may be judged that the corresponding livestock is in the abnormal state when the counted number of times is more than the number of times when the livestock in the normal state is altered to the sleep and non-sleep states within the same preset time, and in the notification and driving control step, when it is judged that the corresponding livestock is in the abnormal state from the final judgment step, the notification message may be output through the external output device.

BRIEF DESCRIPTION OF THE DRAWINGS

FIG. 8A illustrates a 3-axis specific acceleration measurement value before and after applying a saline solution transferred from the biocapsule seated in the rumen as the graph.

FIG. 8B illustrates a 3-axis specific acceleration measurement value before and after applying the saline solution transferred from the biocapsule transplanted to the subcutaneous layer of the livestock as the graph.

FIG. 9A illustrates a calculation of an acceleration measurement value transferred from the biocapsule seated on the rumen of the livestock before and after applying the sedative reducing a momentum of the livestock through Equation 1 as the graph.

FIG. 10A illustrates a calculation of an acceleration measurement value transferred from the biocapsule seated on the rumen of the livestock before and after applying the sedative reducing the momentum of the livestock through Equation 2 as the graph.

FIG. 11A illustrates a calculation of an acceleration measurement value transferred from the biocapsule seated on the rumen of the livestock before and after applying the sedative reducing the momentum of the livestock through Equation 3 as the graph.

FIG. 12A illustrates a change amount of a calculation value acquired by calculating an acceleration measurement value transferred from the biocapsule seated on the rumen of livestock 1 before and after applying the sedative reducing the momentum of the livestock through Equation 3 as the graph.

FIG. 13A illustrates a change amount of a calculation value acquired by calculating an acceleration measurement value transferred from the biocapsule seated on the rumen of livestock 2 before and after applying a stimulant through Equation 3 as the graph.

FIG. 13B illustrates a change amount of a calculation value acquired by calculating an acceleration measurement value transferred from the biocapsule seated on the rumen of livestock 2 before and after applying the stimulant through Equation 3 as the graph.

DESCRIPTION OF EXEMPLARY EMBODIMENTS

Figure 1:
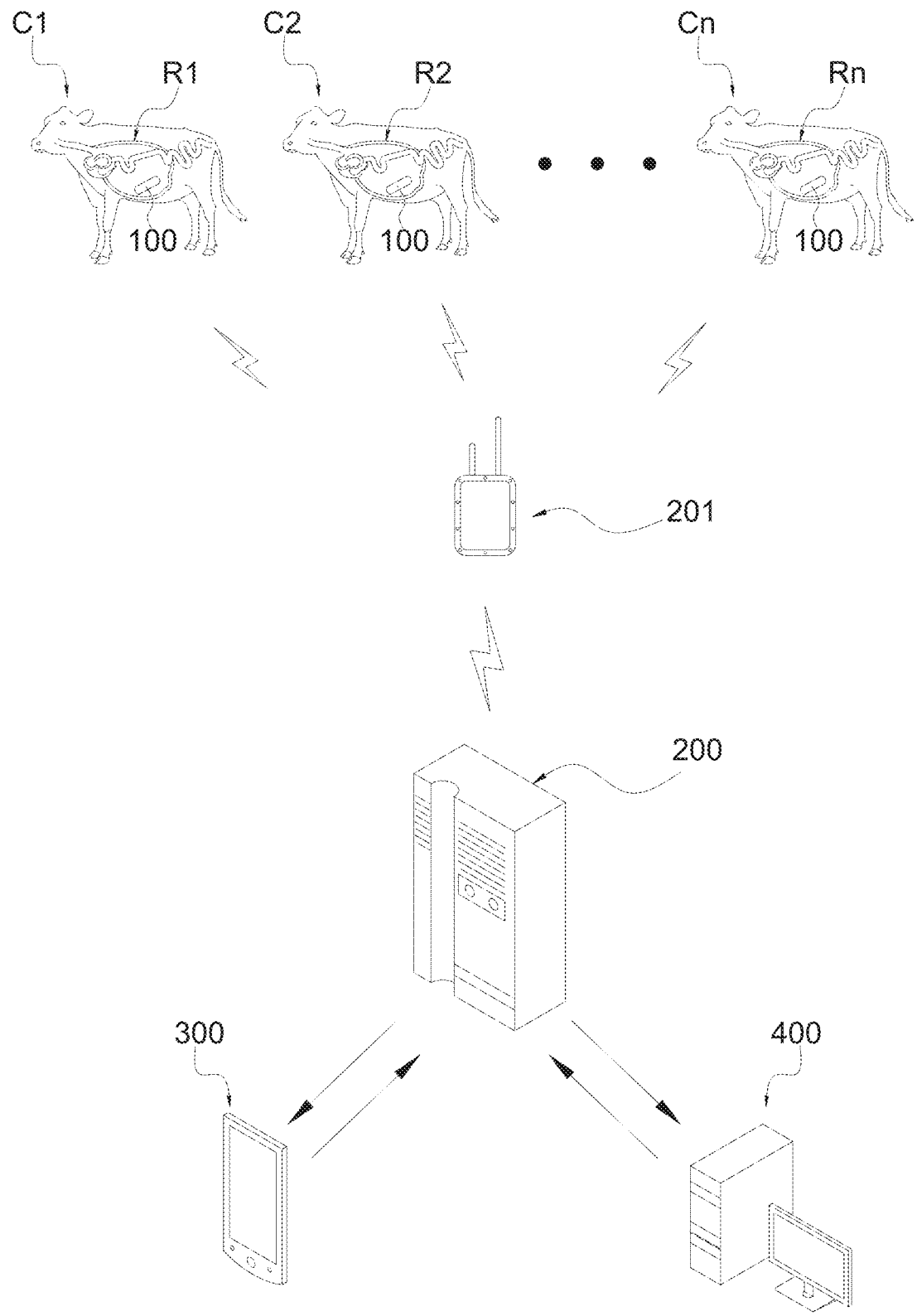
FIG. 1 is a configuration diagram of a behavior analysis system of livestock using an acceleration sensor according to the present disclosure.

The present disclosure may have various modifications and various embodiments and specific embodiments will be illustrated in the drawings and described in detail.

However, this does not limit the present disclosure to specific embodiments, and it should be understood that the present disclosure covers all the modifications, equivalents and replacements included within the idea and technical scope of the present disclosure. In describing each drawing, like reference numerals refer to like elements.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific embodiments, and are not intended to limit the present disclosure. A singular form includes a plural form if there is no clearly opposite meaning in the context. In the present application, it should be understood that the term "include" or "have" indicates that a feature, a number, a step, an operation, a component, a part, or the combination thereof described in the specification is present, but does not exclude a possibility of the presence or addition of one or more other features, numbers, steps, operations, components, parts, or combinations thereof, in advance.

Hereinafter, embodiments of the present disclosure will be described with reference to the accompanying drawings. Like reference numerals illustrated in the respective drawings designate like members. In describing the present disclosure, a detailed description of known functions and configurations incorporated will be omitted so as to avoid obscuring the gist of the present disclosure.

Prior to a description, livestock in the present disclosure which represents a ruminant animal having a rumen may be primarily applied to beef cattle or a cow capable of producing edible beef and milk.

FIG. 1 is a configuration diagram of a behavior analysis system of livestock using an acceleration sensor according to the present disclosure.

The present disclosure relates to a behavior analysis system of livestock using an acceleration sensor and a behavior analysis method using the same, which detect and analyze behaviors such as an intake, rumination, and relaxation of livestock having a rumen to determine a health state, or a timing of or estrus, or a delivery of the corresponding livestock, and the behavior analysis system is constituted by a biocapsule 100 seated within the rumen of the livestock and a server 200 judging a state of the livestock by analyzing a sensor value transferred from the biocapsule 100 as illustrated in FIG. 1.

In this case, the server 200 is connected to an external output device 400 such as a terminal 300 such as a smartphone, a tablet PC, a monitor, etc. and judges and analyzes a sensor value which the biocapsule 100 transfers to the server 200 and outputs a notification message or a monitoring result through which a current state of livestock C for each entity may be confirmed to the terminal 300 and the output device 400 through an output module 230 to be described below.

Figure 2:
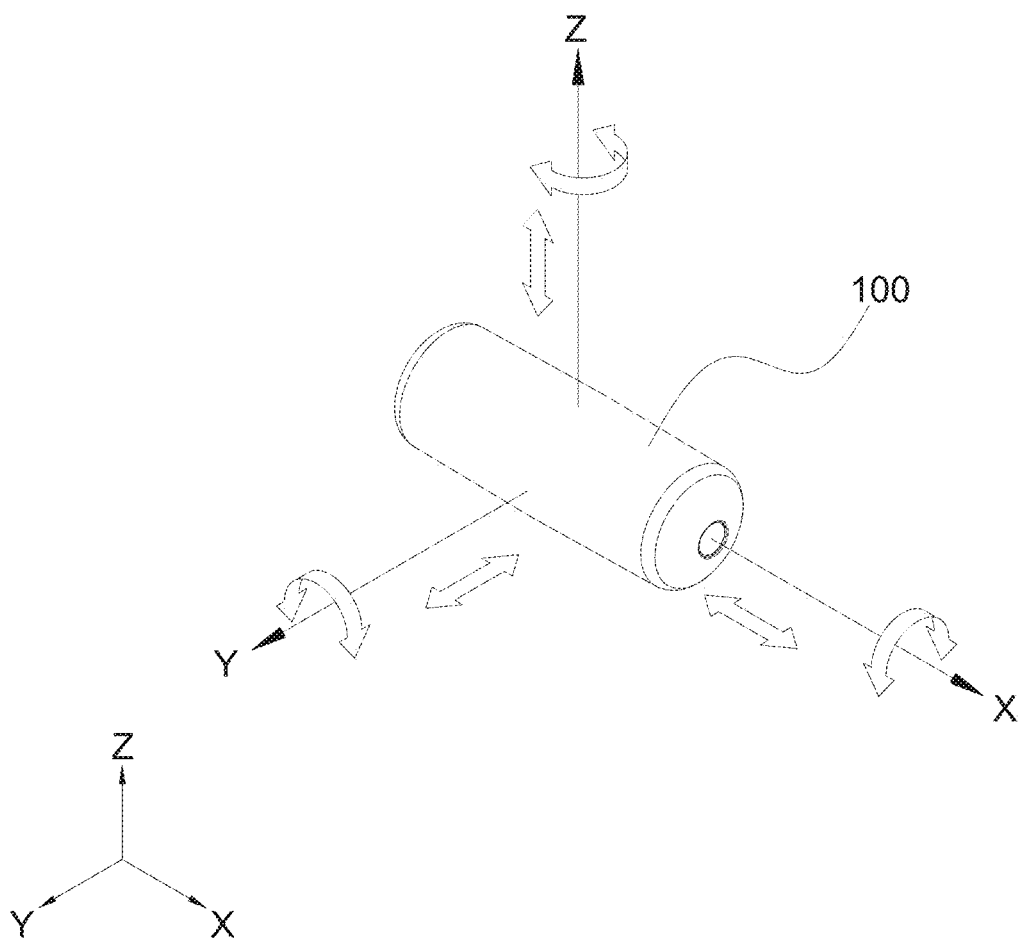
FIG. 2 illustrates a biocapsule according to the present disclosure.
Figure 3:
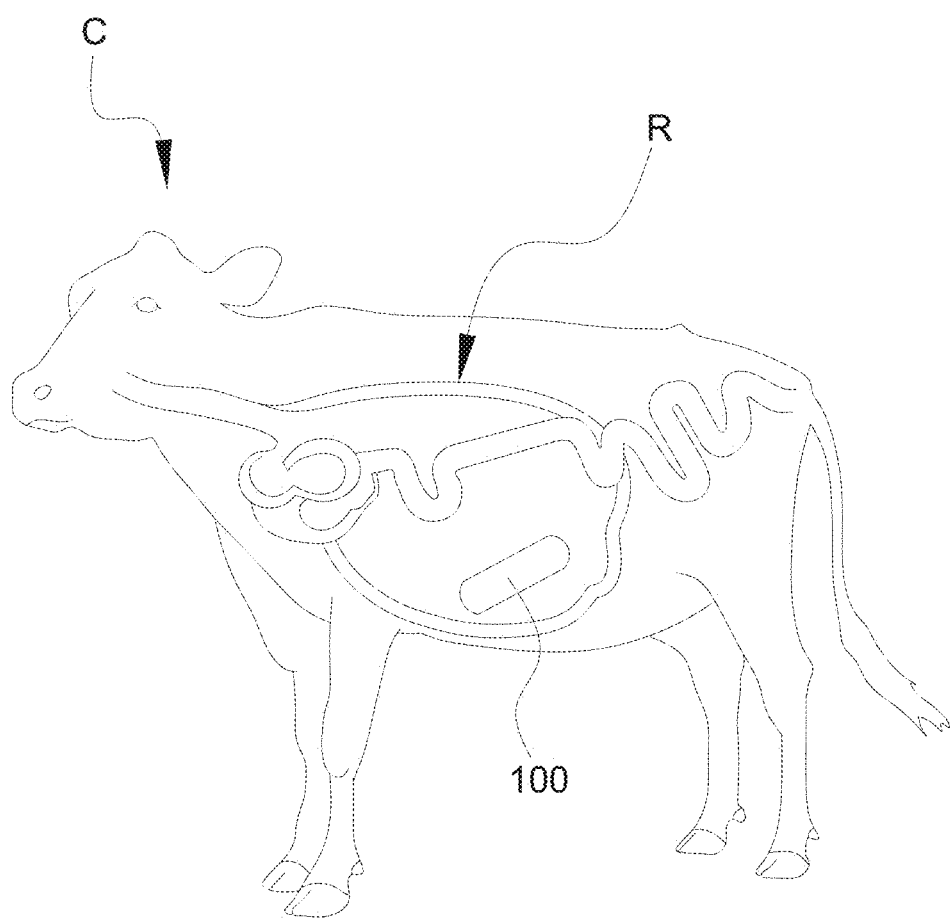
FIG. 3 illustrates an application example of the biocapsule according to the present disclosure.
Figure 4:
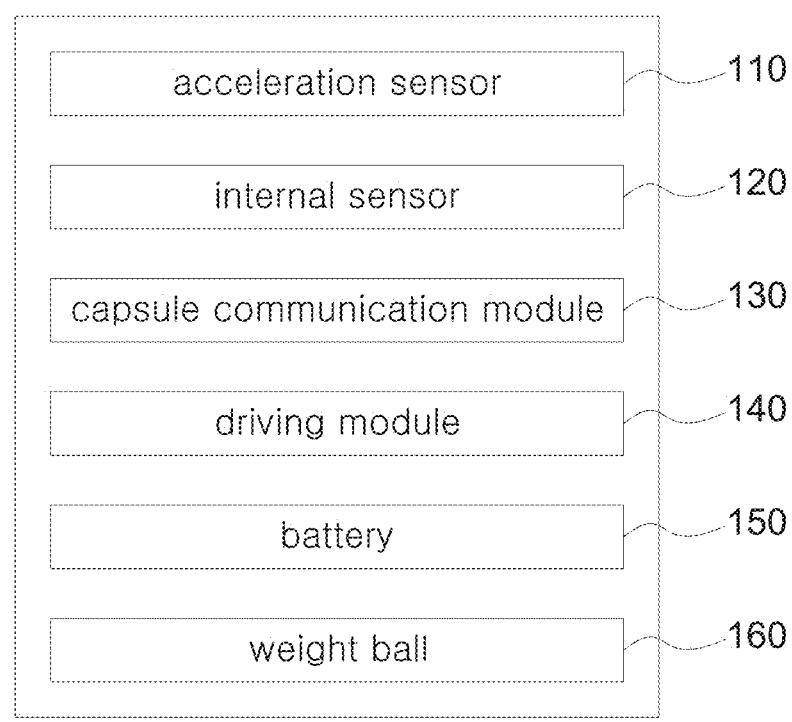
FIG. 4 illustrates a configuration of the biocapsule according to the present disclosure.

FIG. 2 illustrates a biocapsule according to the present disclosure, FIG. 3 illustrates an application example of the biocapsule according to the present disclosure, and FIG. 4 illustrates a configuration of the biocapsule according to the present disclosure.

The biocapsule 100 is individually mounted within rumens R1, R2, Rn of multiple respective livestock C1, C2, . . . , Cn to transfer a sensor value sensed for each entity to an external server 200 through wireless communication.

The biocapsule 100 is individually embedded in all livestock C on a farm to transfer a rumen mobility sensed in each livestock C to the outside. In this case, the livestock C is preferably beef cattle or a cow having the rumen.

Further, the biocapsule 100 has a cylindrical shape as illustrated in FIG. 2, but has a capsule shape in which both side ends are bent, and as a result, a manager directly inserts the biocapsule 100 into the rumen of the livestock or injects the biocapsule 100 together with a feed to seat the biocapsule 100 on the rumen R within the livestock C.

In this case, the rumen on which the biocapsule 100 is seated is generally divided into four rooms such as a rumen, a reticulum, an omasum, and an abomasus in order to perform rumination, and among them, a place on which the biocapsule 100 is seated becomes the rumen and the reticulum which are first and second stomachs, and the biocapsule 100 having a predetermined size in a structure does not move to the omasum which is a third stomach and is seated on the inside of the first and second stomachs in which the rumination primarily occurs to sense the rumen mobility.

The biocapsule 100 in the present disclosure most preferably has a cylindrical shape having a diameter of 36 mm and a length of 125 mm, but is not limited thereto. Further, when the biocapsule 100 is applied to not grown cattle but a calf, the capsule 100 may be manufactured to be smaller than the biocapsule 100.

Referring to FIG. 4, the biocapsule 100 may include an acceleration sensor 110 sensing the rumen mobility, an internal sensor 120 capable of sensing an inner part of the livestock other than a motion, a capsule communication module 130 capable of communicating with the external server 200 or the terminal 300, a driving module 140 capable of controlling whether the biocapsule 100 is driven, a battery 150 storing power, and a weight ball 160.

The acceleration sensor 110 may be provided inside the biocapsule 100, and may measure the motion of the biocapsule 100 which moves together with the rumen, i.e., an acceleration, and sense the rumen mobility including the biocapsule 100 through the measured acceleration.

The acceleration sensor 110 may include a 3-axis acceleration measurement sensor and a 6-axis acceleration measurement sensor, and may sense the motion of the rumen of the livestock on which the biocapsule 100 including the acceleration sensor 110 is seated, convert a sensed sensor value into a digital signal, primarily filter and output the digital signal inside the acceleration sensor 110, and then transfer the sensor value to the outside through the capsule communication module 130.

In this case, the acceleration sensor 110 may transmit the sensor value to the server 200 through the capsule communication module 130 or transmit the sensor value sensed through wireless communication to the server 200 directly, and an SPI or I2C method may be used as a wireless communication method, but is not limited thereto.

Meanwhile, since there is a slight difficulty in that the biocapsule 100 transmits, to the server 200, a collected sensor value directly, a repeater 201 is additionally provided on a farm with multiple livestock C as illustrated in FIG. 1, and as a result, sensor values transferred from multiple biocapsules 100 on the farm are transmitted to the repeater 201 through the capsule communication module 130, and the repeater 201 collects the sensor values transferred from the biocapsule 100 and transmits the collected sensor values to the server 200.

Further, even when the server 200 sends a control signal for controlling driving of the biocapsule 100, the server 200 transmits the control signal to the repeater 201 on the farm in which the biocapsule 100, which does not directly transmit the control signal to the biocapsule 100 but rather controls driving, exists and the repeater 201 receiving the control signal transmits the control signal to the corresponding biocapsule 100.

The repeater 201 adopts a repeater suitable for a communication network used in the server 200, and in the present disclosure, since using a LoRa communication method is a most preferable embodiment, the relay 201 in the present disclosure preferably uses a LoRaWAN based multi-channel outdoor gateway, but is not limited thereto.

The internal sensor 120 is a sensor capable of sensing another element capable of sensing an internal environment of the rumen in addition to the acceleration generated in a 3-axis direction.

The internal sensor 120 may include a sensor capable of sensing a temperature, a pressure, and pH in the rumen, an amount of methane generated in the rumen, etc., and may sense another environmental element in the rumen together with the acceleration sensor 110 and transmit the sensor value sensed through the capsule communication module 130 to the server 200.

The capsule communication module 130 serves to transmit the sensor values generated from the acceleration sensor 110 and the internal sensor 120 embedded in the biocapsule 100 to the external server 200 or the terminal 300, which the manager has, through a wireless communication method. The capsule communication module 130 continuously transmits, to the external server 200 or the terminal 300, a sensor value generated in real time in the biocapsule 100 to allow the manager to continuously monitor the livestock C in which the biocapsule 100 is embedded.

A Long Range (LoRa) communication method which uses low power and is capable of long range communication is most preferably used as the wireless communication method used by the capsule communication module 130, but is not limited thereto and RF, WiFi, etc., may also be used.

When the driving module 140 is transferred with a control value for drive or stop of the biocapsule 100 through a judgment module 220 to be described below, the driving module 140 may control the drive of the battery 150 in the biocapsule 100 through the control value. More specifically, when the livestock C is in a sleep state or it is judged that the biocapsule 100 need not be driven through a monitoring result, the server 200 transfers the control value for the drive of the biocapsule 100 and the driving module 140 controls whether to drive the battery 150 through the control value to stop the use of the battery 1509, thereby preventing unnecessary consumption of power.

Accordingly, the driving module 140 controls the drive of the biocapsule 100 by the server 200 to prevent the biocapsule 100 having limited power from consuming the power in an unnecessary situation.

The battery 150 provides the power so as to drive the biocapsule 100, and when the biocapsule 100 is seated on the rumen in the livestock C, it is very difficult to take out the biocapsule 100 again, and as a result, sufficient power is charged and whether to provide the power may be controlled through the driving module 140.

The weight ball 160 has a predetermined weight so that the biocapsule 100 is fixed while being seated on a lower side inside the rumen to prevent the biocapsule 100 from being in excessive motion or moving to the outside of the rumen according to whether the rumen exercises.

A body state of the livestock C including the rumen mobility of the livestock C is sensed through the biocapsule 100 having the configuration, and the sensed sensor value is transmitted to the server 200 provided externally or the terminal 300 for the manager, and as a result, the server 200 may analyze the behavior of the livestock C and inform the manager (farm owner) of an abnormal state of the livestock C based on the analyzed behavior.

Figure 5:
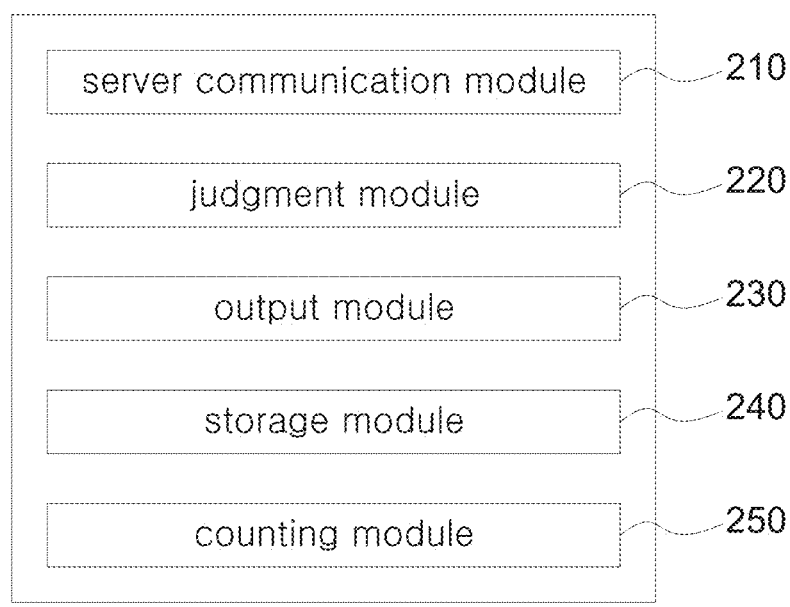
FIG. 5 illustrates a configuration of a server according to the present disclosure.
Figure 6:
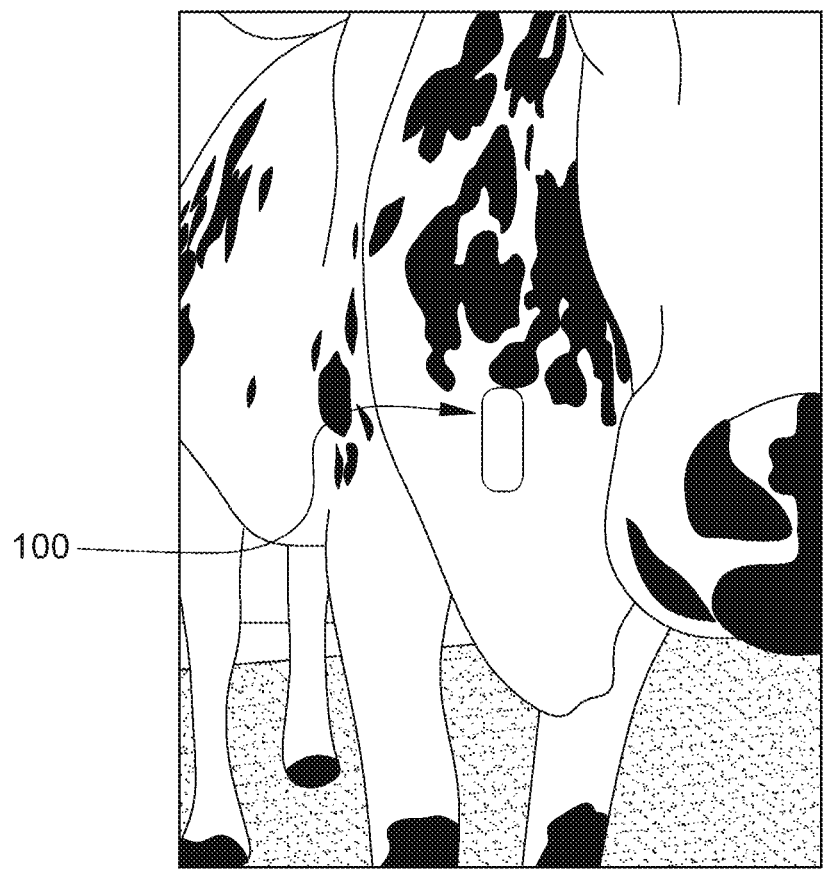
FIG. 6 illustrates an appearance of livestock in which the biocapsule is transplanted to a subcutaneous layer for an experiment.

FIG. 5 illustrates a configuration of a server according to the present disclosure.

Referring to FIG. 5, the server 200 may include a server communication module 210, a judgment module 220, an output module 230, a storage module 240, and a counting module 250.

The server communication module 210 serves to receive the sensor value transferred from the capsule communication module 130 in the biocapsule 100 and transmit a judgment value generated from the judgment module 220 to the connected terminal 300 or biocapsule 100, and connects the biocapsule 100 and the server 200 through wireless communication. The sensor value received by the server communication module 210 is transferred to the judgment module 220 to sort the sensor value transferred from the biocapsule 100 per time according to an internal element of the rumen.

The judgment module 220 may judge current states such as rumination, relaxation, sleep, etc., of the livestock C based on a reference value prestored in the storage module 240 and a sensor value transferred from the biocapsule 100, i.e., an acceleration measurement value for each axis transferred from the acceleration sensor 110 and sensor values transferred from the internal sensor 120, and judge the health state, and delivery, pregnancy, and estrus states of the corresponding livestock C through the judged state. The state of the livestock C judged by the judgment module 220 is generated as a judgment value and transmitted to the manager terminal 300 connected to the server 200 to guide the state of the livestock C to the outside.

Further, the judgment module 220 judges the number of times counted by the counting module 250 to judge whether to drive the biocapsule 100 and generates the resulting control value and transmits the generated control value to the corresponding biocapsule 100 through the server communication module 210 to control the biocapsule 100 to be driven or stopped according to whether the corresponding livestock on which the biocapsule 100 is seated sleeps.

The judgment module 220 calls a set value preset in the storage module 240 to compare the called set value and the sensor value received from the biocapsule 100.

The output module 230 may make the rumen mobility finally judged through an equation to be described below by the judgment module 220 into the graph and provide the rumen mobility to the manager in real time, and emergently outputs the abnormal states (the delivery, the estrus, birth, etc.) of the livestock C analyzed by the judgment module 220 as a notification message apart from the monitoring result.

That is, the judgment module 220 may just specify whether the livestock C is diseased or is not healthy or is in an estrus/pregnancy/delivery approaching state among the analyzed abnormal states of the livestock C, and the output module 230 outputs the notification message prestored in the storage module 240 according to the state of the livestock to output a related matter to the linked manager terminal 300 or output device 400 through the server communication module 210.

The storage module 240 stores the sensor value for each entity transferred through the biocapsule 100 and a set value which becomes a reference is stored so that the judgment module 220 analyzes and judges the state of the livestock C. The set value in the storage module 240 may be stored when the manager initially forms the server 200, and frequently changed or added in link with an external cloud server through the server communication module 210.

Further, the storage module 240 stores a reference value (average value) for the internal environmental element of the rumen according to a normal time, a rumination, and a sleeping time for each entity, for example, for each breed of the cow (Holstein, Jersey, etc.) or for each breed of the beef cattle (Korean cattle, Charolais, etc.), and stores a reference value of a quiver state in which the rumen does not move, and as a result, the judgment module 220 compares the reference value and the sensor value transferred from the biocapsule 100 to analyze and judge the current state of the livestock C. In this case, the reference value of the quiver state in which the rumen does not move preferably specifies a minimum acceleration measurement value of the biocapsule 100 measured at normal times.

For example, the biocapsule 100 measures the rumen momentum of the livestock C and when the rumen is in motion less than the normal times for each corresponding entity, the judgment module 220 senses this and judges that the corresponding livestock C does not normally perform a rumination action to judge that the livestock C is not healthy or has a problem. Accordingly, the judgment module 220 generates a judgment value for the judgment, and transmits the generated judgment value through the output module 230 and the server communication module 210 to announce the abnormal state of the corresponding livestock C as an alarm.

In respect to the set value including the reference value, a normal numerical value for each livestock corresponding to the health state other than one numerical value is just made into data and a predetermined range is set to the reference value based on a normal numerical value and when a numerical value included in the sensor value is more or less than the predetermined range including the normal numerical value, a current state is sensed as the abnormal state to output a related notification message to the outside.

The judgment module 220 includes an analysis unit and a notification unit, and the analysis unit calculates a rumen mobility numerical value of the corresponding livestock C by using an equation prestored in the storage module 240, compares the calculated rumen mobility numerical value and a prestored set value, and determines the rumen mobility of the corresponding livestock C, and analyzes the resulting health state of the livestock C to analyze and determine the current state of the corresponding livestock C.

In the present disclosure, in order to determine the rumen mobility of the livestock C, the acceleration sensor 110 is used, but a different equation from the acceleration sensor 110 in the related art is adopted to more accurately determine the rumen momentum (mobility) of the livestock C.

In this case, the acceleration sensor 110 in the related art calculates the acceleration through the 3-axis specific acceleration measurement value as illustrated in FIG. 2, and since the biocapsule 100 of the present disclosure has a capsule shape of a cylindrical shape extended in a Y-axis direction, there are not many motions on the Y axis, and as a result, when all acceleration measurement values for each axis are utilized, there is a concern that a result which is far from an actual rumen mobility will be acquired.

Accordingly, the present applicant may calculate an optimal acceleration measurement value capable of more accurately judging the rumen mobility of the livestock C through various experimental examples as below.

First, a livestock C and a biocapsule 100 are used in an experiment so as to judge the rumen mobility through the acceleration sensor 110 according to the present disclosure, and equations of converting the sensor value collected from the biocapsule 100 and converting the sensor value into the acceleration measurement value capable of the rumen mobility are as follows.

[Livestock Used in Experiment]

A total of nine non-pregnant and non-lactating Holstein cows were used in Experimental Examples 1 to 3, and, a concentrate and hay were supplied in the same barn twice a day, and water was freely accessible. All experimental protocols were validated by the Institutional Animal Care Use Committee of Seoul National University (SNU-190922-3).

[Biocapsule Used in Experiment]

The acceleration sensor used in Experimental Examples 1 to 3 was manufactured in a form of the biocapsule, and the biocapsule has a cylindrical shape having a weight of 180 to 200 g, a diameter of 36 mm, and a length of 125 mm, and includes a temperature sensor. An X axis of the biocapsule was the same as a long-axis direction of the biocapsule, and horizontal and vertical directions of a long axis were set to a Y axis and a Z axis, respectively. The biocapsule was administrated together with the feed, and seated within the rumen, and data transmission was performed by using a LoRa network in the wireless communication method, and a reference line meaning shaking and a posture meaning the motion was recorded.

Experimental Example 1. Acceleration Measurement Value of Biocapsule in Livestock to which Sedative Reducing Momentum of Livestock, and Physiological Saline Solution are Administrated A pair of biocapsules were mounted on three Holstein cows for the experiment, but one biocapsule was seated within the rumen of the livestock, and the other biocapsule was inserted into a subcutaneous tissue at a position adjacent to the biocapsule mounted on the rumen the chest of the cow.

The sedative was administrated in order to derive a change of the rumen momentum of the live stock in which a pair of biocapsules are mounted on the rumen and the subcutaneous tissue, respectively. In this case, the administrated sedative has an effect to settle the motion of the livestock with xylazine, and an administration capacity was set to 0.05 mg/kg.

An acceleration measurement value (hereinafter, 3XA-R) transferred from the biocapsule mounted on the rumen of the livestock injected with the sedative and an acceleration measurement value (hereinafter, 3XA-SC) transferred from the biocapsule inserted into the subcutaneous tissue of the same livestock were compared. Further, acceleration data was acquired by administrating the physiological saline solution in the same method after three days.

In this case, the transferred acceleration measurement values were sensed at 10 Hz, and among the acceleration measurement values of each axis generated for 24 seconds, a value when an acceleration magnitude calculated through [Equation 1] to [Equation 3] was the largest was set to be acquired in the server. A collected value was transmitted and recorded every 2 minutes for 4 hours.

$$V=\sqrt{X^2+Y^2+Z^2} \quad \text{[Equation 1]}$$

$$V1=\sqrt{(X_t-X_{t-1})^2+(Y_t-Y_{t-1})^2+(Z_t-Z_{t-1})^2} \quad \text{[Equation 2]}$$

$$V2=\sqrt{(X_t-X_{t-1})^2+(Z_t-Z_{t-1})^2} \quad \text{[Equation 3]}$$

Here, X represents an acceleration measurement value of the X axis of the biocapsule, Z represents an acceleration measurement value of the Z axis of the biocapsule, and t represents a time.

Figure 7A:
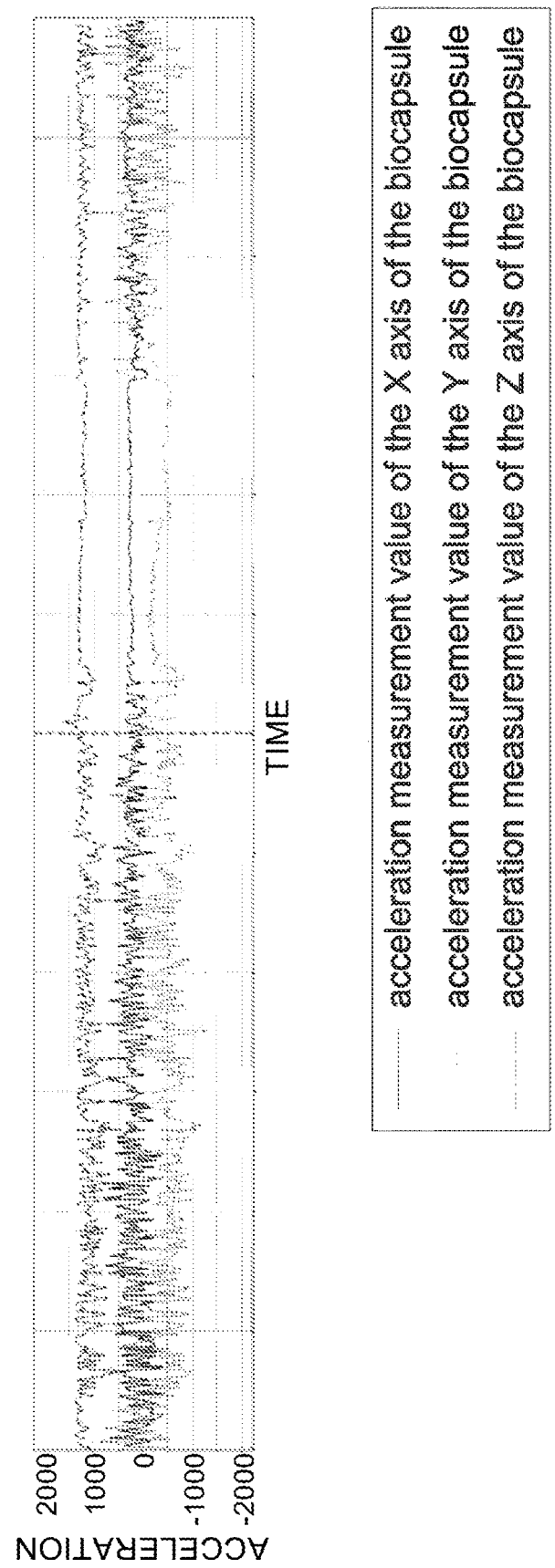
FIG. 7A illustrates a 3-axis specific acceleration measurement value before and after applying a sedative transferred from the biocapsule seated in the rumen as a graph as illustrated in FIG. 3.
Figure 7B:
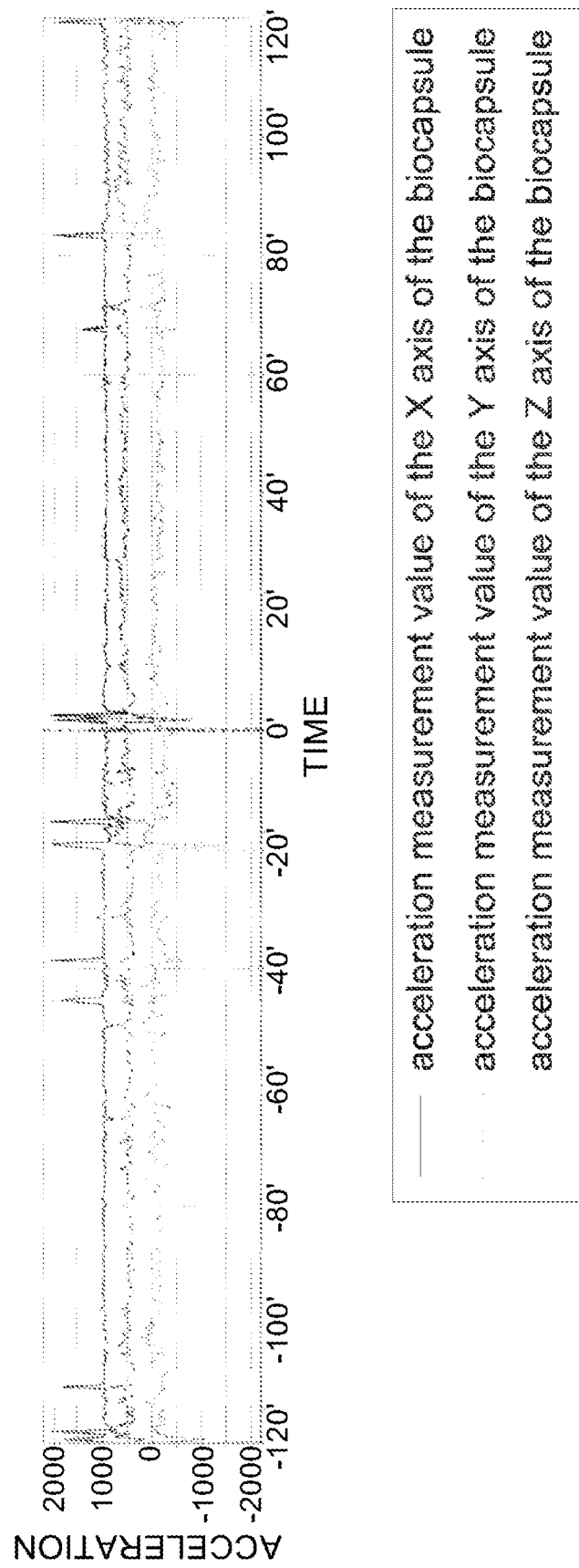
FIG. 7B illustrates a 3-axis specific acceleration measurement value before and after applying a sedative transferred from the biocapsule transplanted to the subcutaneous layer of the livestock as the graph as illustrated in FIG. 6.

Acceleration measurement values for each axis of the livestock to which the xylazine is individually administrated through Experimental Example 1 described above are illustrated as in FIG. 7A (corresponding to 3XA-R) and FIG. 7B (corresponding to 3XA-SC). In this case, red dotted lines shown at centers of the graphs of FIGS. 7A and 7B indicate a xylazine administration timing.

Among them, as illustrated in FIG. 7A, 3XA-R fluctuated at a predetermined level for each axis before administrating the xylazine, but a frequency and an amplitude of the acceleration measurement value after administrating the xylazine were reduced after administrating the xylazine, and a pattern occurred for approximately 60 minutes. Thereafter, fluctuation of the acceleration measurement value occurred again similarly to the fluctuation before administration.

On the contrary, as illustrated in FIG. 7B, 3XA-SC was smaller after administrating the sedative than before administrating the sedative, but there was no noteworthy change.

Further, there was no difference in a fluctuation pattern before and after administrating 3XA-R and 3XA-SC generated by injecting the physiological saline solution as illustrated in FIGS. 8A and 8B.

Figure 9B:
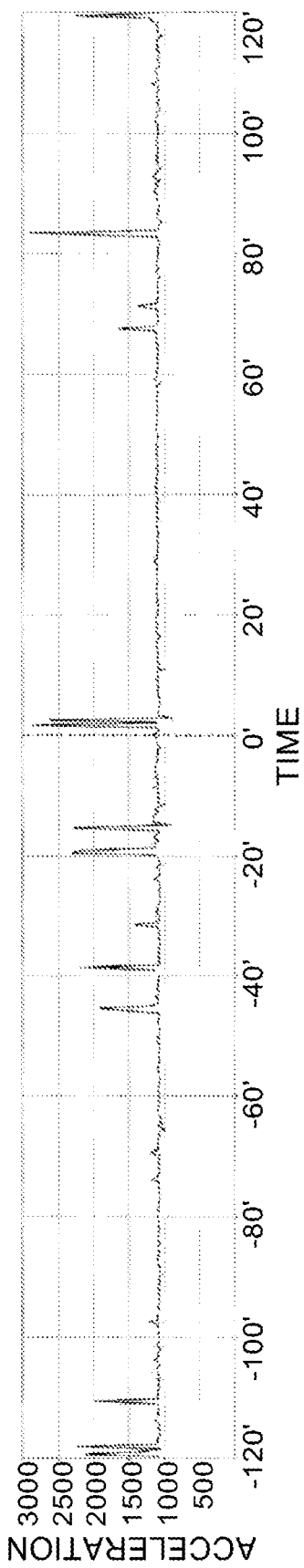
FIG. 9B illustrates a calculation of an acceleration measurement value transferred from the biocapsule transplanted to the subcutaneous layer of the livestock before and after applying the sedative reducing the momentum of the livestock through Equation 1 as the graph.
Figure 10B:
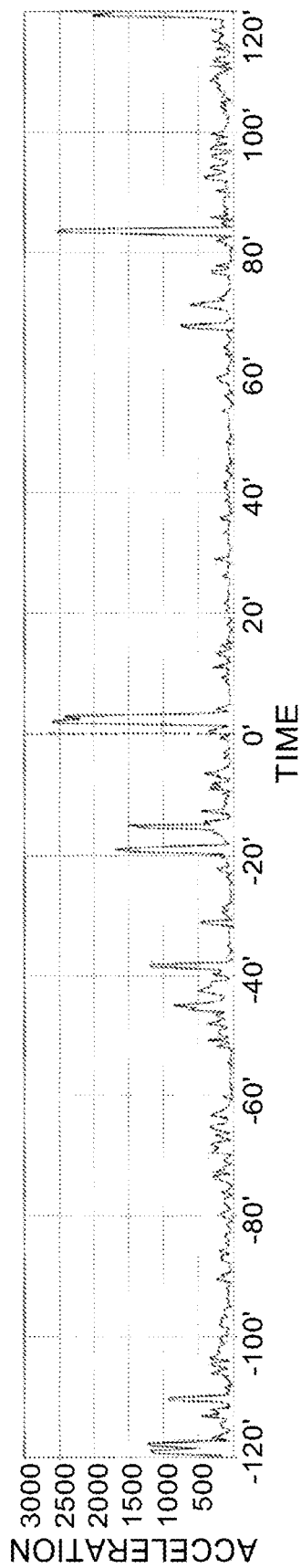
FIG. 10B illustrates a calculation of an acceleration measurement value transferred from the biocapsule transplanted to the subcutaneous layer of the livestock before and after applying the sedative reducing the momentum of the livestock through Equation 2 as the graph.
Figure 11B:
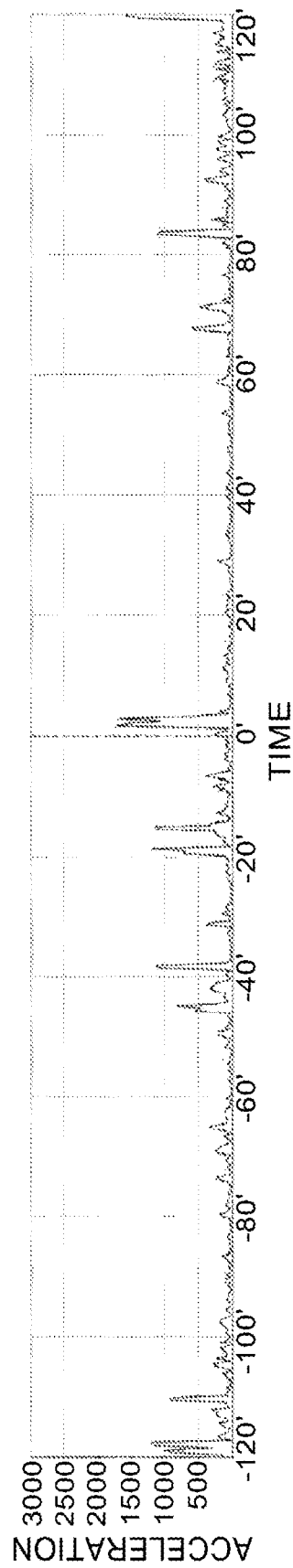
FIG. 11B illustrates a calculation of an acceleration measurement value transferred from the biocapsule transplanted to the subcutaneous layer of the livestock before and after applying the sedative reducing the momentum of the livestock through Equation 3 as the graph.

FIGS. 9A and 9B illustrate acceleration measurement values V calculated by using Equation 1 with the acceleration measurement values of 3XA-R and 3XA-SC illustrated in FIGS. 7A and 7B, respectively. As a result, before administrating the xylazine, a V value oscillated between 1000 and 1600, but after administrating the xylazine, an amplitude width was reduced to a range between 1200 and 1290. Further, in order to maximize a difference between pre- and post-administration of the xylazine, an acceleration measurement value V1 calculated through Equation 2 is illustrated as in FIGS. 10A and 10B, and an acceleration measurement value V2 calculated through Equation 3 is illustrated as in FIGS. 11A and 11B.

As can be confirmed through FIGS. 10 and 11, the difference before and after administrating the xylazine may be confirmed more clearly in V2 than in V1.

Accordingly, it may be confirmed that among Equations 1 to 3 of calculating the acceleration measurement value with the sensor value measured through the biocapsule through Experimental Example 1, the rumen mobility may be measured most clearly in the acceleration measurement value calculated by using Equation 3 as the equation capable of more accurately representing the momentum of the livestock, Experimental Example 2. Acceleration Measurement Value of Biocapsule in Livestock to which Sedative Reducing Momentum of Livestock, and Stimulant Increasing Momentum of Livestock are Administrated In Experimental Example 2, the xylazine which is the sedative reducing the momentum of the livestock was administrated to livestock 1 and atropine sulfate which is the stimulant increasing the momentum of the livestock was administrated to livestock 2. In this case, the sedative and the stimulant influence the momentum, i.e., the motion of the livestock, and do not influence the rumen mobility of the livestock.

Figure 12B:
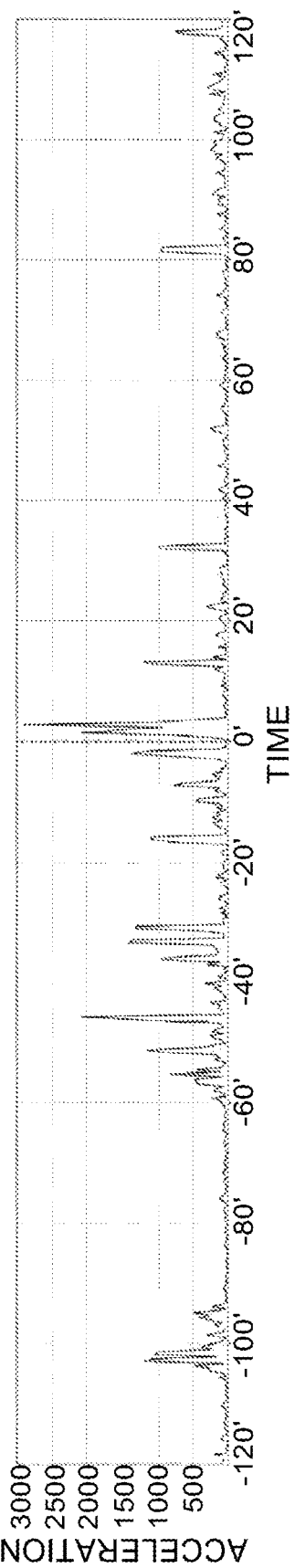
FIG. 12B illustrates a change amount of a calculation value acquired by calculating an acceleration measurement value transferred from the biocapsule transplanted to the subcutaneous layer of livestock 1 before and after applying the sedative reducing the momentum of the livestock through Equation 3 as the graph.

First, with respect to the 3XA-R of livestock 1, the acceleration measurement value V2 calculated through Equation 3 was maintained to be low for approximately 10 to 80 minutes after administration as in FIG. 12A and maintained to be low for approximately 15 to 60 minutes after administration as in FIG. 13A in the case of livestock 2.

On the other hand, it may be confirmed that atropine-administrated livestock 2 continued to move, and acceleration measurement value obtained from the 3XA-SC as illustrated in FIG. 13B appeared at a high peak immediately after administration, and as a result, it may be confirmed that data which may be obtained from the 3XA-R are affected mainly by the capsule movement caused by reticular contraction of the rumen than by body movement of the livestock.

Accordingly, it may be confirmed that it is possible to more accurately confirm the rumen mobility capable of judging the health state or the abnormal state of the livestock through Experimental Example 2 with the biocapsule mounted in the rumen.

Experimental Example 3. Acceleration Measurement Value of Biocapsule in Livestock with Different Sedative Administration Degrees Comparative Groups 1 and 2 were set in which 0.05 mg/kg and 0.1 mg/kg were injected as administration amounts of the xylazine which is the sedative reducing the momentum of the livestock with respect to the weight, respectively, and a control group was set by administrating physiological saline solution of the same amount as Comparative Group 2.

Figure 14:
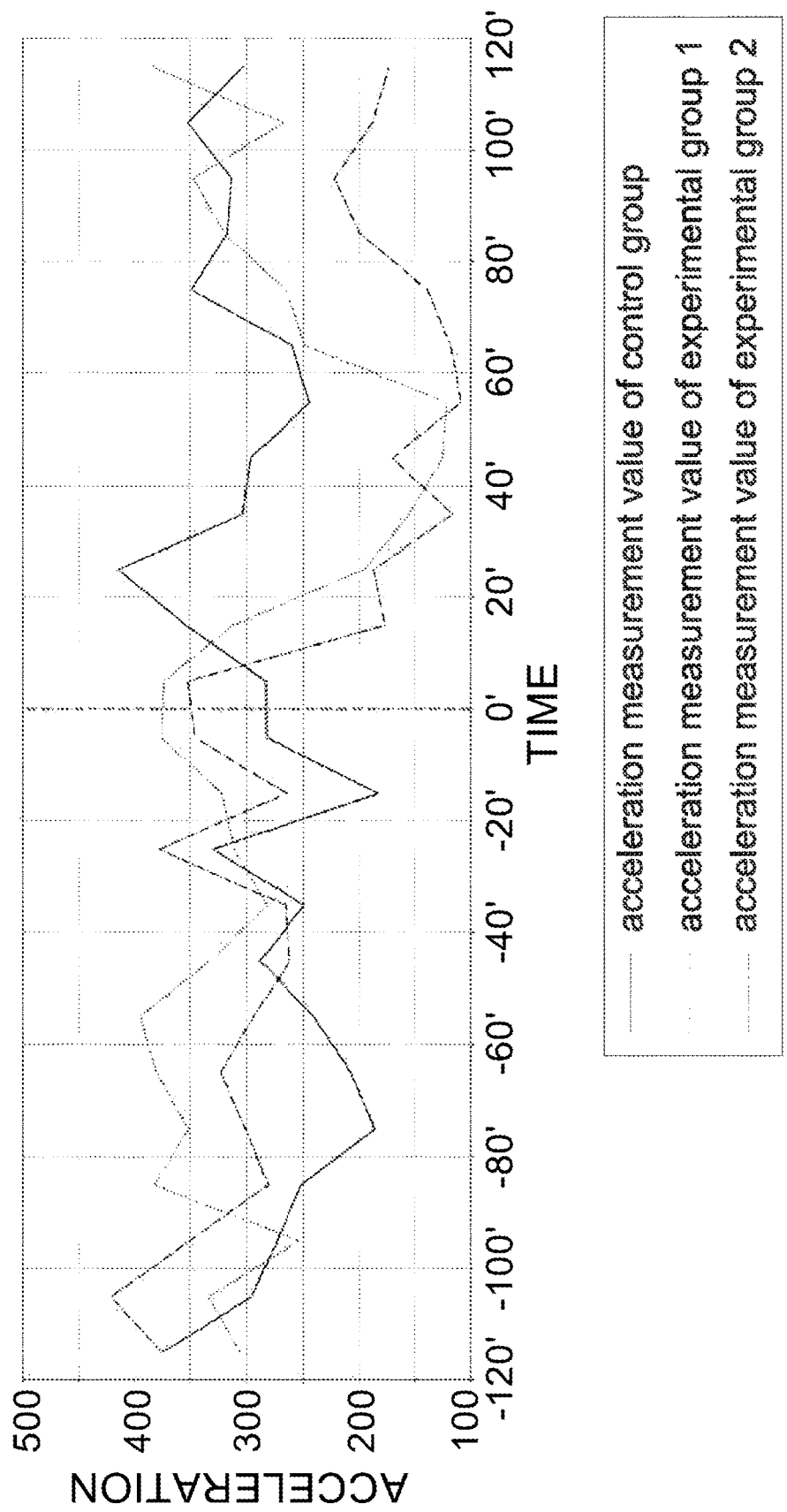
FIG. 14 illustrates a calculation value acquired by calculating an acceleration measurement value transferred from the biocapsule seated on the rumen of Experimental Groups 1 and 2, and a control group to which the sedative is applied through Equation 3 as the graph.

FIG. 14 illustrates an acceleration measurement value V2 calculated through Equation 3 for 3XA-R of Comparative Groups 1 and 2, and the control group. It was confirmed that the acceleration measurement value V2 calculated through Equation 3 for the 3XA-R indicates the rumen mobility through Experimental Examples 1 and 2, and referring to this, the rumen mobilities in Comparative Groups 1 and 2 were significantly decreased within 30 minutes and between 30 to 60 minutes, respectively, after administrating the xylazine. In particular, it may be confirmed that compared to the control group, the rumen mobilties in Comparative Groups 1 and 2 were significantly decreased up to 30 minutes and 60 minutes, respectively.

Accordingly, with respect to the sensor value obtained from the biocapsule mounted within the rumen of the livestock through Experimental Example 3, it was confirmed that the rumen mobility of the livestock may be more accurately determined through the acceleration measurement value calculated through Equation 3.

Consequently, through Experimental Examples 1 to 3, in the present disclosure, the biocapsule 100 is mounted within the rumen R of the livestock C, the acceleration measurement value for each axis obtained through the biocapsule 100 is calculated by using Equation 3 embedded with the judgment module 220, and the rumen mobility is judged and analyzed through the calculated acceleration measurement value to sense the health state or the abnormal state of the livestock, and increase accuracy for the judgment result.

In a case where the acceleration measurement value of the biocapsule 100 decreases to a value equal to or less than a prestored set value in a normal state through the judgment module 220, the counting module 250 counts the number of times of the case occurs and when the number of times counted per time through the counting module 250 reaches the number of times counted, which is prestored in the storage module 240, it is judged that the rumen mobility is decreased compared with the normal state, and as a result, the judgment module 220 judges and analyzes that the corresponding livestock C is in the sleep state, and thus, transmits a control value for controlling power supply of the battery 150 to the biocapsule 100 in the corresponding livestock C, and, through this, the driving module 150 minimizes the power supply of the battery 150 to prevent the acceleration sensor 110 and the internal sensor 120 from being driven when the livestock C sleeps, thereby preventing unnecessary power consumption.

Further, the counting module 250 transmits a control value for driving the biocapsule 100 according to a preset time, and as a result, the biocapsule 100 starts to sense the rumen mobility of the livestock C again after the set time. In this case, when the livestock is still in the sleep state through the biocapsule 100 which starts sensing again, the driving of the biocapsule 100 is stopped again.

As described above, the driving of the biocapsule 100 may be stopped when the livestock is in the sleep state through the counting module 250 and the driving module 140, resensing is started every preset time, when the livestock is in the sleep state, the driving of the biocapsule 100 is stopped again and after resensing, and when rumen mobility corresponds to the prestored set value in the normal state, it is judged that the livestock wakes up to continuously drive the biocapsule 100.

Further, the sleep state is changed to the normal state after resensing by the biocapsule 110, the counting module 250 counts the number of times of starting the redriving, the number of times counted is compared with the number of times of starting the redriving of the biocapsule 100 of the livestock in the normal state within the same prestored time, and when it is analyzed that the corresponding livestock is frequently in the sleep state or redriving is frequently started, it is analyzed that the corresponding livestock has a problem or is in the abnormal state to guide this to the outside.

That is, it is difficult for livestock which is not healthy frequently to be in the sleep state or maintain the sleep state, and as a result, the livestock frequently changes between the sleep and non-sleep states. Therefore, this is sensed and analyzed to determine the state of the livestock.

Figure 15:
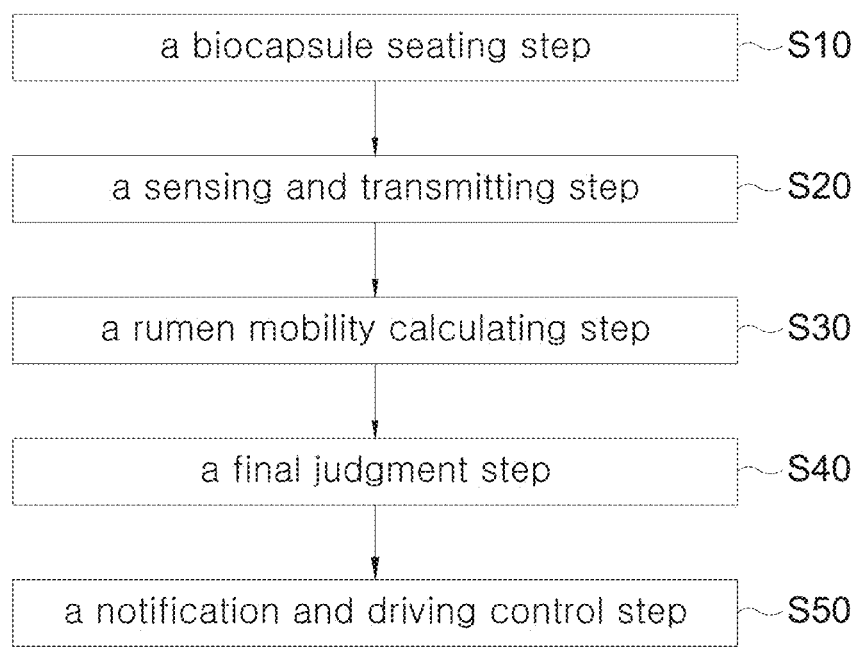
FIG. 15 illustrates a behavior analysis method of livestock using an acceleration sensor according to the present disclosure as a flowchart.

FIG. 15 illustrates a behavior analysis method of a ruminant animal using an acceleration sensor according to the present disclosure as a flowchart.

Referring to FIG. 15, the behavior analysis method through the behavior analysis system having the above-described configuration includes a biocapsule seating step (S10), a sensing and transmitting step (S20), a rumen mobility calculating step (S30), a final judgment step (S40), and a notification and driving control step (S50).

First, in the biocapsule seating step (S10) as a step of individually seating the biocapsule 100 within the rumen R of the corresponding livestock C for each of all livestock C within the farm which needs to be managed, as described above, the biocapsule 100 may be injected together with feed injection or the manager may directly insert the biocapsule 100 into the rumen R.

The biocapsule 100 seated within the rumen R of the livestock performs the sensing and transmitting step (S20) of sensing the rumen mobility (momentum) using the acceleration sensor 110 and sensing other sensing elements (the temperature, pH, the pressure, etc.) within the rumen R using the internal sensor 120, and transmitting the sensed rumen mobility and sensing elements to the external server 200.

Thereafter, the judgment module 220 performs the rumen mobility calculating step (S30) of being capable of calculating the rumen mobility according to the prestored equation based on the sensor value for the rumen mobility transferred from the acceleration sensor 110 among sensor values transferred to the server 200 through the sensing and transmitting step (S20). In this case, in the rumen mobility calculating method, the rumen mobility is calculated by using Equation 3 as described above.

The final judgment step (S40) of judging the health state or the abnormal state of the corresponding livestock C in the judgment module 220 is performed based on the rumen mobility (momentum) of the corresponding livestock C calculated through the rumen mobility calculating step (S30) and the other sensing elements transferred from the internal sensor 120 within the corresponding livestock C.

In this case, in the final judgment step (S40), in addition to the acceleration sensor 110 and the internal sensor 120, the number of times counted through the counting module 250 is judged to judge the sleep state and the abnormal state of the corresponding livestock.

The notification and driving control step (S50) of being capable of outputting the notification message capable of guiding the abnormal state of the livestock C to the manager terminal 300 connected to the server 200 through the output module 230 when sensing the abnormal state of the livestock C through the final judgment step (S40) and controlling the driving of the biocapsule 100 when the driving of the biocapsule 100 is not separately required because the corresponding livestock C is in the sleep state through the final judgment step (S40) may be performed.

The current state of the livestock C may be sensed through the biocapsule 100 including the acceleration sensor 110 through the steps, and the state of the livestock C may be analyzed and judged based on a sensing value therefore, and as a result, the livestock C which is in the abnormal state may be easily judged even from the outside without a need for the manager to separately directly manage the livestock C, and the manager may quickly confirm and handle the abnormal state through the judged abnormal state.

Consequently, the present disclosure has an advantage that the rumen mobility of the livestock is sensed through the biocapsule seated in the rumen rather than directly diagnosing and evaluating the health state of the livestock, and transferred to the external server 200 or the external terminal 300 through the wireless communication, and as a result, the manager may determine the health state or the abnormal states (disease, estrus, delivery, etc.) of the corresponding livestock, and early diagnoses the disease to more enhance the productivity of the livestock.

Further, the sleep state of the livestock may also be judged together in addition to the rumen momentum to automatically control whether the acceleration sensor 110 and the internal sensor 120 are driven, thereby preventing excessive power consumption in the biocapsule 100 having limited power.

Optimal embodiments in the drawings and the specification are disclosed. Here, although specific terms have been used, the terms are only used for the purpose of describing the present disclosure and are not used to limit the scope of the present disclosure as defined in the claims. Therefore, it will be appreciated by those skilled in the art that various modifications and other embodiments equivalent thereto can be made therefrom.

As described above, according to the present disclosure, there is an effect that a lot of livestock can be monitored at once and the health state, or a timing of estrus or the delivery of the corresponding livestock can be judged through the monitoring to enhance the production of the cattle farm and prevent the disease or the death of the livestock.

Further, there is an effect that the rumen motility is more accurately sensed by deriving an equation capable of rapidly determining the rumen motility rather than an equation for calculating a momentum of the livestock using the acceleration sensor in the related art, and applying the derived equation to enhance reliability and accuracy of a behavior analysis of a ruminant animal.

Further, there is an effect that sleep and non-sleep states of the livestock are determined according to the momentum of the rumen, battery consumption is minimized by automatically adjusting an operation time and a sensing time of a biocapsule according to a monitoring requirement time, and the present disclosure can be used for a long time.

The effects of the present disclosure are not limited to the aforementioned effect, and other effects, which are not mentioned above, will be apparent to a person having ordinary skill in the art from the following disclosure.

What is claimed is:

1. A system for analyzing a behavior of a ruminant animal using an acceleration sensor, the system comprising:
   a biocapsule injected into a rumen in livestock and embedded with the acceleration sensor; and
   a server analyzing a sensor value transferred from the biocapsule and analyzing a health or abnormal state of the corresponding livestock,
   wherein the biocapsule transmits, to the server, a 3-axis specific acceleration measurement value measured by the acceleration sensor by wireless communication,
   the server includes
   a judgment module judging and analyzing a state of the corresponding livestock by comparing the sensor value transferred from the biocapsule and a prestored set value, and
   a storage module storing the set value, and
   the judgment module applies the 3-axis specific acceleration measurement value transferred from the acceleration sensor to a prestored following equation and an acceleration V2 of the biocapsule, and compares the calculated acceleration V2 and the preset set value, and analyzes the health or abnormal state of the corresponding livestock, $$V2 = \sqrt{(X_t - X_{t-1})^2 + (Z_t - Z_{t-1})^2} \quad \text{[Equation]}$$

(here, X represents an acceleration measurement value of the X axis of the biocapsule, Z represents an acceleration measurement value of the Z axis of the biocapsule, and t represents a time).

2. The system of claim 1, wherein the biocapsule includes an internal sensor sensing an internal environment of the rumen within the livestock, and a capsule communication module connected to the server through the wireless communication and transmitting the sensor value.

3. The system of claim 2, wherein the internal sensor is capable of at least one of a temperature, a pressure, pH, and an amount of methane generated from the rumen.

4. The system of claim 3, wherein the judgment module synthesizes an acceleration calculated through the 3-axis acceleration measurement value transferred from the acceleration sensor and the sensor value sensed by the internal sensor, and compares the synthesized value with a preset set value to analyze the state of the livestock.

5. The system of claim 1, wherein the biocapsule includes a driving module controlling whether the biocapsule is driven through a control value transferred from the server, the server includes,
    a counting module prestoring a minimum value of an acceleration measurement value generated when the livestock is in a non-sleep state and counting the number of times when the acceleration measurement value measured through the biocapsule decreases to the minimum value or less, and
    the counting module judges whether the livestock is in the sleep state when the number of times when the acceleration measurement value measured through the biocapsule decreases to the minimum value or less is more than the prestored number of times, and transfers the control value to the driving module to drive the biocapsule with a minimum power.

6. The system of claim 5, wherein the counting module counts the number of times when the livestock is altered to the sleep and non-sleep states, and compares the counted number of times with the number of times when the livestock in the normal state is altered to the sleep and non-sleep states within the same preset time, and judges that the corresponding livestock is in the abnormal state when the counted number of times is more than the number of times when the livestock in the normal state is altered to the sleep and non-sleep states within the same preset time.

7. A behavior analysis method through a behavior analysis system of livestock using an acceleration sensor, the method comprising:
    a biocapsule seating step of mounting a biocapsule within a rumen within livestock;
    a sensing and transmitting step of sensing a 3-axis specific acceleration by the biocapsule mounted on the rumen and transmitting the sensed 3-axis specific acceleration measurement value to a server;
    a rumen mobility calculating step of calculating a rumen mobility of the corresponding livestock through the 3-axis specific acceleration measurement value transmitted to the server;
    a final judgment step of comparing the calculated rumen mobility and a rumen mobility of livestock in a normal state, which is prestored to judge the normal state or an abnormal state of the corresponding livestock; and
    a notification and driving control step of transmitting a notification message according to the corresponding abnormal state to an external output device linked with the server when the abnormal state is sensed in the final judgment step, wherein:
in the final judgment step,
    the acceleration measurement value transferred from the biocapsule and the rumen mobility of the livestock in the normal state in a non-sleep state, which is prestored in the server, are compared, and the number of times when the acceleration measurement value is less than the rumen mobility is counted, and when the counted number of times is counted to be equal to or more than a preset number of times, it is judged that the corresponding livestock is in the sleep state, and
in the notification and driving control step,
    when it is judged that the corresponding livestock is in the sleep state in the final judgment step, driving of the biocapsule in the corresponding livestock is stopped and the biocapsule is redriven after a preset time.

8. The method of claim 7, wherein:
in the sensing and transmitting step,
    an internal environment of the rumen in the livestock is sensed in addition to an acceleration in the biocapsule, and
    the internal environment includes at least one of a temperature, a pressure, pH, and an amount of methane generated from the rumen; and
in the final judgment step,
    the normal state or abnormal state of the livestock is judged through the acceleration measured from the biocapsule and the internal environment.

9. The method of claim 7, wherein the number of times when the livestock is altered to the sleep and non-sleep states is counted, and the counted number of times with the number of times when the livestock in the normal state is altered to the sleep and non-sleep states within the same preset time are compared, and it is judged that the corresponding livestock is in the abnormal state when the counted number of times is more than the number of times when the livestock in the normal state is altered to the sleep and non-sleep states within the same preset time, in the final judgment step, and
    in the notification and driving control step, when it is judged that the corresponding livestock is in the abnormal state from the final judgment step, the notification message is output through the external output device.

* * * * *